A. McC. FLUHARTY.
BREAD TOASTER.
APPLICATION FILED FEB. 17, 1915.

1,212,340.  Patented Jan. 16, 1917.

WITNESSES:
G. Garland Brown.
W. Thornton Bogert

INVENTOR.
Allan McC. Fluharty
BY
ATTORNEY.

UNITED STATES PATENT OFFICE.

ALLAN McC. FLUHARTY, OF INDIANAPOLIS, INDIANA, ASSIGNOR TO THE CINCINNATI GALVANIZING COMPANY, OF CINCINNATI, OHIO, A CORPORATION OF OHIO.

BREAD-TOASTER.

1,212,340.

Specification of Letters Patent.

Patented Jan. 16, 1917.

Application filed February 17, 1915. Serial No. 8,727.

*To all whom it may concern:*

Be it known that I, ALLAN McC. FLU-HARTY, a citizen of the United States of America, and resident of Indianapolis, county of Marion, State of Indiana, have invented certain new and useful Improvements in Bread-Toasters, of which the following is a specification.

This invention relates to bread toasters and has for an object to produce a bread toaster which will toast bread more uniformly than other toasters known to me.

A further object is to produce a bread toaster which will toast both sides of a slice of bread simultaneously.

A further object is to produce a bread toaster which will toast bread with less heat than other toasters known to me.

Figure 1:
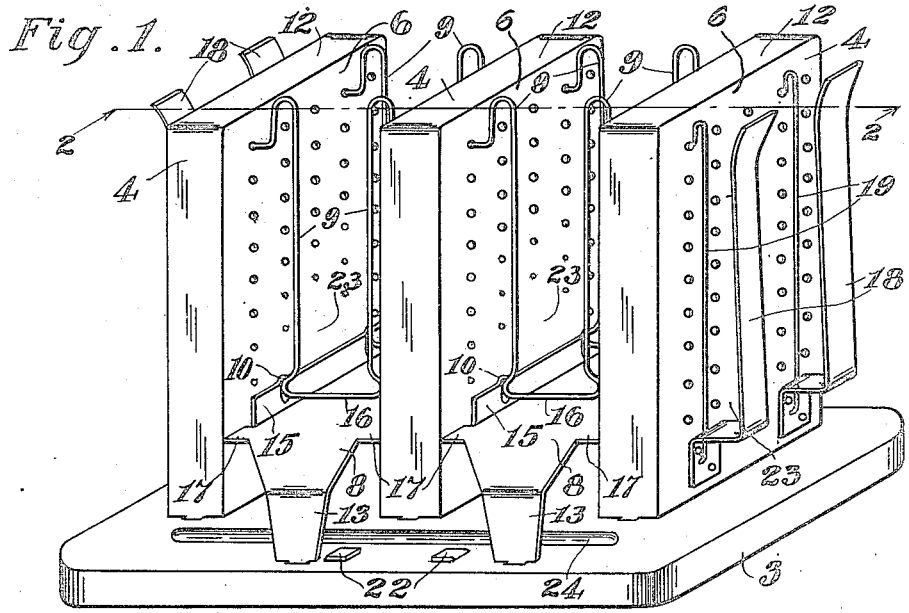
Figure 2:
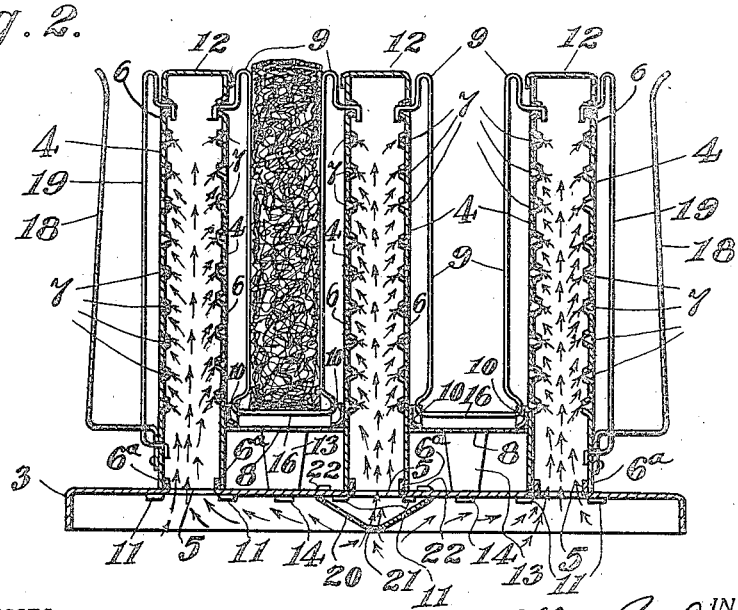

These and other objects are attained in the bread toaster described in the following specification and illustrated in the accompanying drawings in which:

Figure 1 is a perspective view of a toaster embodying my invention. Fig. 2 is a sectional view taken on the line 2—2 of Fig. 1, with a slice of bread in position in the toaster.

The toaster embodying my invention consists of a hollow base plate 3 which is preferably formed of sheet metal, a series of tubes or flues 4 which are mounted over apertures 5 formed in the base plate and which are provided with flat sides 6 having a series of perforations 7 formed therein, and baffle plates 8 which are located between the upwardly extending tubes 4 and which are spaced away from the base plate 3, for the purpose of preventing the direct heat of the plate 3, from burning the bread to be toasted. Above the baffle plates 8 and between the tubes 4 are located a series of wire support members 9 the upper ends of which are secured in the uppermost perforations of the tubes, and the lower ends of which are held securely in depressions 10 formed in the baffle plates. The base apertures 5 in the base plate 3 are preferably formed with upwardly extending flanges 6ᵃ over which the upwardly extending tubes 4 mounted on the base plate, are adapted to fit. These tubes 4 are secured in position over the flanges by having lugs 11 projecting from the bottom edge thereof and extending through apertures formed in the base plate adjacent to the flanges 6ᵃ. The lugs, after the tubes have been placed in position, are bent over into engagement with the plate 3 as shown in Fig. 2. By this means the tubes are secured rigidly in position.

The tops of the tubes are closed by plates 12 which are preferably formed integrally with the tubes, since the tubes are constructed of sheet metal. This causes the hot gases which rush upwardly through the tubes, to leave the tubes through the apertures 7 and to be projected against the sides of the slice of bread located in position, as shown in Fig. 2. In addition to the lugs 11 which are bent over into engagement with the under face of the plate 3, the baffle plates 8 are formed with legs 13 which are provided with lugs 14 adapted to pass through apertures in the base plate 3 and to be secured to the plate in the same manner that the lugs 11 secure tubes 4 in position on the plate. The edges of the baffle plates 8 are turned upwardly to form flanges 15 which are spaced away from the walls of the tubes and which permit the heat from the baffle plate to pass upwardly adjacent to the apertures 7 and against both sides of the bread to be toasted. It is in these flanges 15 that the depressions 10 for receiving the lower looped ends 16 of the wire support members 9 are located, but as shown in Fig. 2, the walls of the depressions 10 are brought into engagement with the sides 6 of the tubes in order to aid in creating a more rigid structure. In order to form an additional support of the tubes 4 and for the purpose of spacing the flanges 15 equidistant from the walls of adjacent tubes 4, a series of projections 17 are formed on each side of each of the baffle plates.

In the drawings I have illustrated means for supporting two additional slices of bread, this means consisting of a pair of supporting strips 18 secured at their lower ends to the outer faces of the outer tubes and having their upper ends free to receive a slice of bread to be toasted. In addition to this, means for spacing the bread which consists of wire spacers 19 similar to the wire spacers 9, are provided to hold the bread away from the outer surfaces of the outer tubes. Secured to the bottom of the base plate 3 and adapted to partially close the opening to the central tube 4, is secured a baffle plate 20 which is provided, with a longitudinally extending aperture 21 formed in its apex. The inclined sides of the baffle plate are provided for directing the correct amount of heat from the fire located beneath the toaster, into the tubes located on each side of the central tube, and the size of the aperture 21 is preferably determined by experiment in order to permit the same amount of heat to enter the central tube as that which enters the end tubes. This baffle plate 20 is secured to the base plate 3 in much the same manner that the tubes 4 and the baffle plates 8 are secured to the base plate, lugs 22 being provided for this purpose. In order to prevent the base plate 3 from buckling because of the extreme heat to which it is subjected while the toaster is in use, I have formed the base plate with corrugations 24 which extend at right angles to the length of the tubes 4 and are located on each side of the tubes.

In use, the bread to be toasted is placed in the wire support members or spacers 9 between the adjacent tubes, and the toaster is placed over the fire. The heat and flames from the burner are then directed upwardly through the aperture 21 and into the central tube of the toaster, while the inclined sides of the baffle plate 20 direct the same amount of heat as that received by the central tube 4, into each of the end tubes 4 of the toaster. The heat leaving the apertures 7 formed in each of the tubes, is projected against the opposite faces of the slice of bread located in position in the support members 9, and the bread is thereby toasted uniformly, both sides of the bread being toasted simultaneously. This prevents the bread from buckling or warping because of unequal expansion or contraction of the surface during the toasting operation and for this reason the bread remains flat.

In forming the apertures 7, I preferably puncture the metal of the tubes in such a manner that a series of apertures are formed which have funnel shaped walls, with the mouth of the funnel located adjacent to the surfaces of each slice of bread. Because of this shape of the apertures 7, the hot gases leaving the apertures are permitted to expand and to be distributed evenly over the slices of bread being toasted in order to uniformly brown the surfaces thereof. I have not only formed the apertures 7 in the above described manner, but I have also formed the apertures in such a manner that the apertures located toward the edges of the tubes are much larger than the apertures located toward the center and lower edges of the tubes. In fact I so form the apertures that as the center and lower edge of each face of each tube is approached, the apertures diminish in size, so that those located centrally of the faces of each tube, are materially smaller than those located around the edges of the tubes. Toward the bottom of each perforated face of each tube, the apertures will diminish in size until a blank space is left, the blank space being indicated at 23 in Fig. 1. The purpose of so forming the apertures is to uniformly distribute the toasting heat over the surfaces of each slice of bread. I have found that at the blank spaces 23 there is sufficient radiated heat from the base plate 3, and also from the heat passing upwardly through the tubes, as well as the heat passing between the flanges 15 and the tubes, to brown the bread sufficiently without the necessity of providing apertures at this point.

I have found that the apertures located above the blank space 23 and toward the center of the plate, do not have to be as large as the apertures located toward the edges of each space of each tube, since the heat in the center of the tube is much greater than the heat toward the edges of the tube. This necessitates cutting off some of the heat toward the center and directing it toward and through the larger apertures located adjacent to the edges of the tube in order to more uniformly distribute the heat over the surfaces of the bread to be toasted. Furthermore I have so spaced the perforations with relation to one another that they are located distances apart, no less than the greatest dimension of each perforation. In fact they have been so spaced that adjacent perforations are spaced apart distances much greater than the dimensions of the perforations, because I have found that the funnel shaped construction of the walls of the perforations act to spread out the heat in cone-like formation and to contact the surfaces of the bread located between the tubes, in a series of overlapping disk-like points of contact. To space the perforations too closely would be to minimize the beneficial effect of the heat projected through each perforation and to cause eddying of the conflicting jets of heat issuing from the perforations, so that the proper uniformity of heat engaging the surfaces of the bread located between the tubes, would not be obtained. I have provided the support members 18 on each outer face of each of the outer tubes, for the purpose of utilizing any excess heat which may pass through the outer tubes, and also for providing means for toasting but one side of each slice of bread, located on the support members, since it may be preferable at times to toast the bread in this manner. I have secured the wire support members or spacers 9 and 19, in position in the tubes in such a manner that they may be easily removed therefrom for the purpose of cleaning the baffle plates and other portions of the toaster after it has been used.

Having thus described my invention, what I claim is:

1. A bread toaster comprising a base having a series of apertures formed therein, a perforated tube mounted on the base over each of the apertures, means for supporting bread to be toasted between the tubes, baffle plates located between the means and the base, and means mounted on the base for distributing the heat uniformly to said tubes.

2. In a bread toaster the combination of a base, perforated tubes mounted on the base, and means adapted to support bread to be toasted between said tubes, the perforations of said tubes increasing in size from the center of each face of each tube to the edges thereof.

3. In combination in a bread toaster, a base, a series of perforated tubes mounted on the base, and means adapted to support bread to be toasted between the tubes, the perforations of said tubes having funnel-shaped walls diverging from the interior of the tubes to the exterior thereof.

4. In combination in a bread toaster, a base having a series of apertures formed therein, a series of perforated tubes mounted on the base over the apertures and having their opposite ends closed, means for supporting bread to be toasted between the tubes, and baffle plates located between the means and the base, each perforation of the tubes being spaced from each of its adjacent perforations a distance greater than the greatest dimension of the perforations.

5. In combination in a bread toaster, a base, a series of perforated tubes mounted on the base, and means adapted to support bread to be toasted between the tubes, the perforations of the tubes having funnel-shaped walls diverging from the interior of the tubes to the exterior thereof, adjacent perforations of the tubes being spaced apart distances no less than the dimensions of the perforations.

6. A bread toaster comprising a base having a series of apertures formed therein, a perforated tube mounted on the base over each of the apertures, means for supporting bread to be toasted between the tubes, baffle plates located between the means and the base, and means mounted on the base for distributing the heat uniformly to the tubes, adjacent perforations of the tubes being spaced apart distances greater than the dimensions of the perforations.

7. In a bread toaster the combination of a base, perforated tubes mounted on the base, and means adapted to support bread to be toasted between the tubes, the perforations of the tubes increasing in size from the center of each tube to the edges thereof and spaced from each of their adjacent perforations a distance greater than the greatest dimension of the perforations.

8. In combination in a bread toaster, a base, a series of perforated tubes mounted on the base, and means adapted to support bread to be toasted between the tubes, the perforations of the tubes having funnel-shaped walls diverging from the interior to the exterior of the tubes, spaced apart distances greater than the dimensions of the perforations, and increasing in size from the center of each face of each tube to the edges thereof.

In testimony whereof, I have hereunto subscribed my name this 13th day of February, 1915.

ALLAN McC. FLUHARTY.

Witnesses:
WALTER F. MURRAY,
RALPH H. INOTT.